A. L. WYMAN.
LEVER.
APPLICATION FILED OCT. 7, 1912.
1,089,615.
Patented Mar. 10, 1914.
2 SHEETS—SHEET 1.
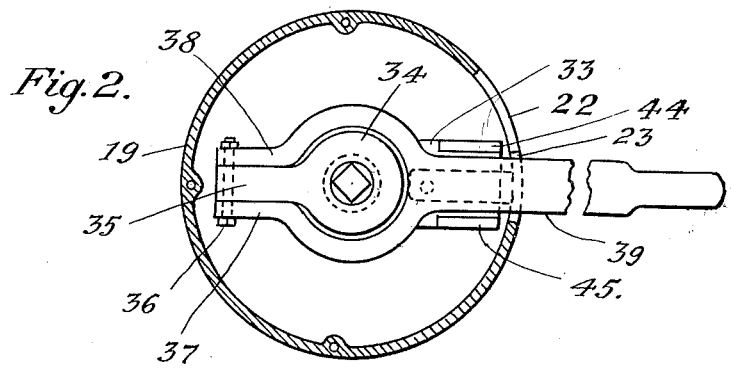
Fig. 2.
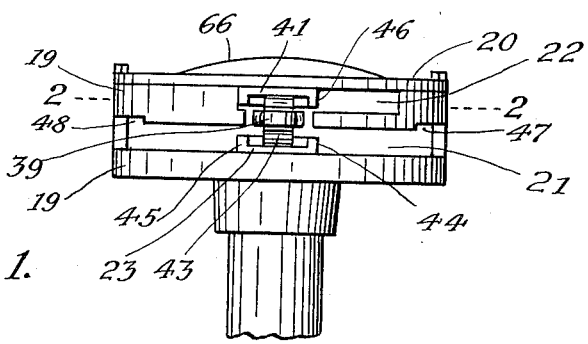
Fig. 1.
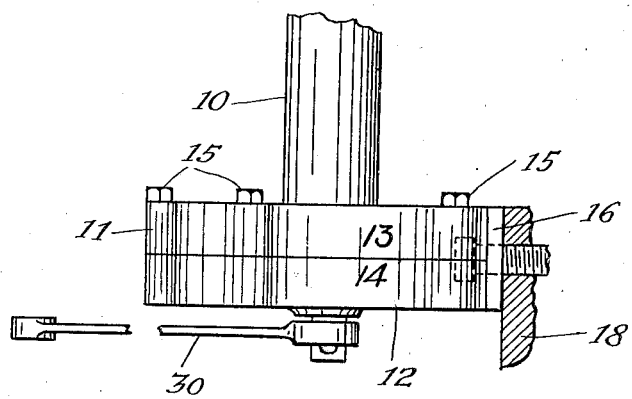
Witnesses:
Theo. Lagaard
H. A. Bowman
Inventor:
Alton L. Wyman.
By F. A. Whiteley
his Attorney.

A. L. WYMAN.
LEVER.
APPLICATION FILED OCT. 7, 1912.
1,089,615.
Patented Mar. 10, 1914.
2 SHEETS—SHEET 2.
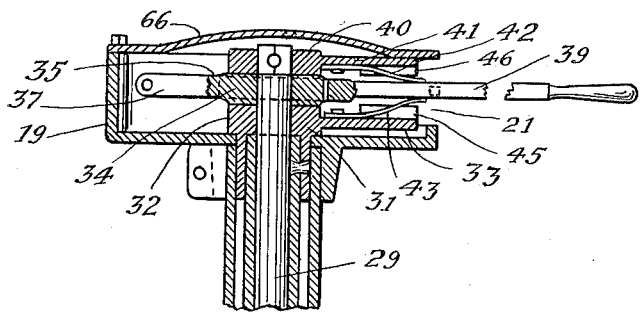
Fig. 3.
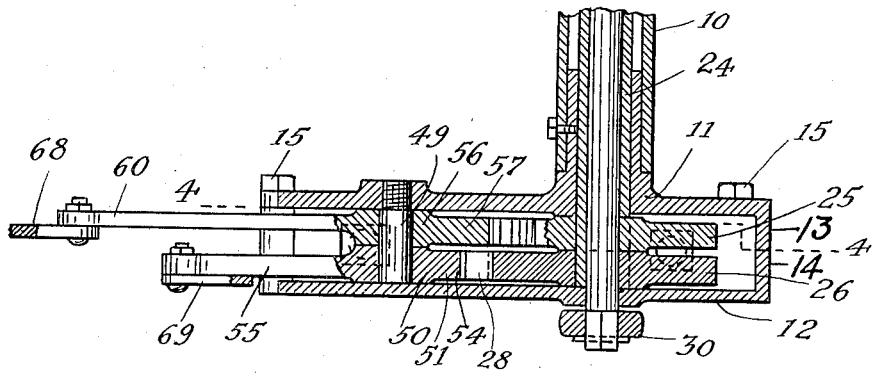
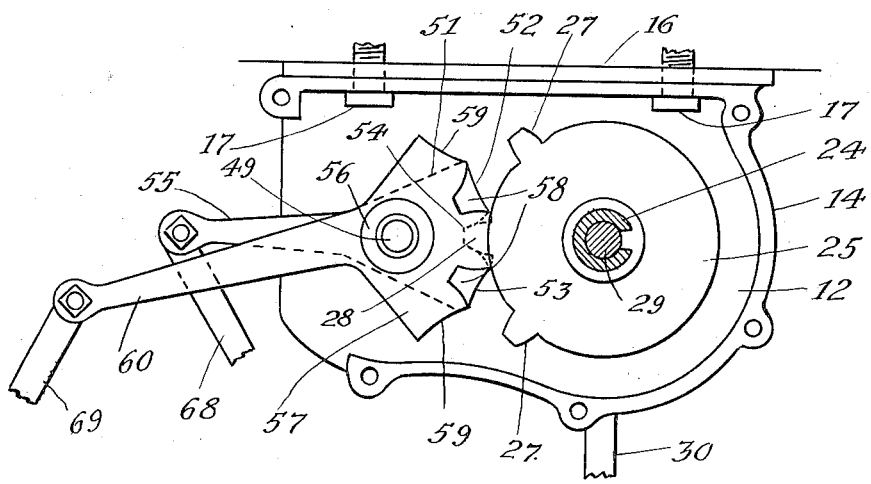
Fig. 4.
Witnesses:
Theo. Lagaard.
H. A. Bowman.
Inventor:
Alton L. Wyman.
By P. A. Whiteley
his Attorney.
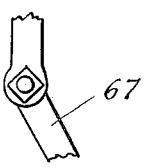

UNITED STATES PATENT OFFICE.

ALTON L. WYMAN, OF MINNEAPOLIS, MINNESOTA, ASSIGNOR TO WINONA WAGON COMPANY, OF WINONA, MINNESOTA, A CORPORATION.

LEVER.

1,089,615.      Specification of Letters Patent.      Patented Mar. 10, 1914.

Original application filed May 18, 1912, Serial No. 698,260. Divided and this application filed October 7, 1912. Serial No. 724,301.

*To all whom it may concern:*

Be it known that I, ALTON L. WYMAN, a citizen of the United States, residing at Minneapolis, in the county of Hennepin and State of Minnesota, have invented certain new and useful Improvements in Levers, of which the following is a specification.

My invention relates to a lever system and has for its object the provision of a lever system for control of motor vehicles or the like such that the various control devices—change speed, reverse and brakes—may be operated by a single lever.
It is also an object of my invention to arrange this lever system in connection with a lever stand which may readily be removed from one part of a framework and attached to another part without disarranging any part of the lever system proper, but merely require the disconnection of the links by which the lever mechanism is connected to the different parts to be operated thereby.

The full objects and advantages of my invention will appear in connection with the detailed description thereof and are particularly pointed out in the claims.

In the drawings, illustrating the application of my invention in one form,—Figure 1 is a front elevation of the lever stand and parts carried thereby. Fig. 2 is a section on line 2—2 of Fig. 1. Fig. 3 is a longitudinal sectional elevation through the lever stand, and Fig. 4 is a sectional plan taken on line 4—4 of Fig. 3.

The lever system employed comprises a single lever having three possible movements, any one of which connects with mechanism for operating the transmission differentially. This lever mechanism comprises primarily a tubular stand 10 which is secured to a base plate 11, said base plate having bolted in parallel spaced relation therewith a similar plate 12, as indicated most clearly in Figs. 1 and 3, plate 11 being provided with a marginal flange 13 and plate 12 with a similar marginal flange 14 so that when said plates are secured together by means of bolts 15 a housing is formed between the plates. The flanges 13 and 14 extend around three sides of the plates but are omitted on the fourth side so that the chamber formed in the said housing is open at one side. The flange 14 is integrally ex-
tended at one side in a lip 16 and by means of bolts 17 extending through such lip and half openings in the flanges 13 and 14, the entire lever stand is removably secured to a frame member 18. To the top of tubular stand 10 is secured a cup-like cylindrical head 19 to the top of which is bolted a cap 20. The cylindrical head has formed at one side thereof two peripheral grooves 21 and 22 connected by a passage 23 extending from the center of groove 21 to one end of the groove 22.

Within the tubular member 10 is a tubular sleeve 24 which has secured thereto in the housing formed by the plates 12, 13, a pair of disks 25, 26, disk 25 having a pair of teeth 27 positioned on said disk at separated points thereof, while disk 26 is provided with a single tooth 28 relatively positioned midway between teeth 27 on disk 25. Obviously, the two disks 25 and 26 with the teeth thereon may be cast in a single piece if desired. Through the center of sleeve 24 extends a shaft 29, the same being freely rotatable in sleeve 24 and having secured to the lower end thereof an arm 30. As shown, the arm 30 is without the housing formed by plates 11, 12, but it is practicable to widen said housing and mount the arm 30 within the same beneath the disk 26 in which case said arm would extend out through the open end of the housing before mentioned. Secured to the upper end of sleeve 24 and within the cavity of the cup member 19 is a hub 31 which has a shoulder 32 forming a bearing in the bottom plate of member 19, the hub 31 being provided with an arm 33 extending to a point adjacent the slot 21 in the wall of member 10.

Loosely mounted on shaft 29 and resting upon hub 31 is a collar 34 provided with an arm 35. Pivotally secured to the end of arm 35 by means of a bolt 36 extending through arms 37 and 38 straddling the arm 35 is a lever 39, arms 38 and 37 being integral extensions of said lever and being expanded so as to embrace or extend about the collar 34, and the exposed part of the hub 31. Above the collar 34 and secured to shaft 29 is a hub 40 extending from which is an arm 41, the arm 41 being parallel with the arm 33 and hub 31. The lever 39 is held normally in balanced position between arms 41 and 33 by means of a leaf spring 42 secured to arm 41 and a similar spring 43 is secured to arm 33. The lever 39 is thus held not only in balanced position between the arms 33 and 41 but within the passage 23 between slots 21 and 22, which passage is of approximately the width of the lever so that the margins of the wall of member 19 at such passage will normally hold the lever 39 from movement in either direction. The arm 33 is broad and provided with a pair of wings 44, 45 forming a space between the same adapted to receive the shank of lever 39 when the same is pressed downwardly against the force of spring 43. The lever 41 is provided with corresponding wings 46 adapted to receive between them the shank of lever 39 when the same is pressed upwardly against the force of spring 42. It will thus be seen that when lever 39 is pressed down between wings 44 and 45, it may be moved in either direction in the slot 21, and when so moved will carry with it arm 33 which will oscillate the sleeve 24 in either of said directions.

Notches 47 and 48 are formed above at the ends of the slot 21 for receiving and holding the lever 39 in either of its extreme positions. When the lever 39 is pressed upwardly between wings 46 on arm 41, it may be moved in one direction only in slot 22, carrying with it the arm 41 which will thereby rock shaft 29 and arm 30 thereon. Upon a post 49 secured between plates 12 and 11 is pivoted a hub 50 having on one side thereof a segment 51 formed with two circular engaging portions 52, 53 and an intermediate notch 54 for receiving the tooth 28 on disk 26. Secured to hub 50 and extending away from segment 51 is an arm 55. Pivotally mounted upon post 49 above hub 50 is a hub 56 having thereon a segment 57 formed with two notches 58 and also formed with circular engaging portions 59 similar to engaging portions 52, 53; and fast on hub 56 and extending outwardly from segment 51 is an arm 60. The member 19 is closed by a cap 66. All of the above parts are comprised in the single removable lever stand removably secured by means of bolts 17 to any desired frame member 18.

The frame member 18 may be any part of a motor vehicle or other machine to which my lever system is to be applied such as the frame member of the traction engine or the hound of the motor wagon, as shown in my co-pending application, Serial Number 698,260, filed May 18, 1912, of which this application is a division.

The arms 30, 55 and 60 are the actuating members of my lever system and these will be connected by means of links 67, 68 and 69, respectively, with the control system. When the lever 39 is brought into its upper position in operative engagement with arm 41 and is oscillated in the slot 22 the shaft 29 alone will be operated and in one direction only from normal position which will, through arm 30 and connecting link 67 clutch the engine in for normal or high speed operation of the motor vehicle in a forward direction. When the lever 39 is brought into its lower position so as to be in operative engagement with arm 33 in the slot 21 it may be swung in both directions from its normal or inoperative position. In whichever direction the lever 39 may be operated both of segments 25 and 26 will be simultaneously oscillated in that direction which will result in actuating first the arm 55 through tooth 28 engaging notch 54 and thereafter the arm 60 through tooth 27 engaging one or the other of notches 58. The links 68 and 69 therefore are each actuated consecutively and independently whenever the arm 44 is caused by lever 39 to swing in one or the other direction in slot 21, the actuation of links 68 and 69, of course, being in opposite directions according to whether lever 39 is moved to right or left in slot 21. There results from this operation, first, a shifting of members in the transmission through link 68, in whichever direction it may be operated, such that when the drive shaft is clutched in the same will be driven at reduced speed, and second, through the operation of link 69, the drive shaft will be clutched in to operate ahead when the link 69 is actuated in one direction and will be clutched in to operate the reverse when the link 69 is actuated in the opposite direction. Through the single lever 39, therefore, the transmission of the motor is controlled for full speed ahead, slow speed ahead and slow speed reverse. It will be seen also that it is impossible to set the motor for reverse speed without first throwing off the high speed since the reverse of the motor can only be effected by actuation of arm 33 when lever 39 operates in slot 21, whereas high speed can only be effected through arm 41 when lever 39 operates in slot 22.

The advantages of my improved lever system will be apparent. Such a device may be used with especial advantage in connection with motor vehicles intended for agricultural or farm use or for general purposes in which the operator will not be a skilled mechanic or one having the qualifications of the ordinary chauffeur. The use of the single lever having the three movements for effecting two speeds ahead and reverse always at slow speed, and which reverse cannot be effected without first throwing out the high speed will result in safeguarding the motor and transmission and preventing accident from improper operation of the device through ignorance on the part of the operator.

While my lever system is of particular advantage when employed in connection with motor vehicles, it obviously may be used in other types of machinery where it is desirable to control a plurality of operations by a single lever, and such use falls within the scope of my invention.

I claim:

1. A lever system comprising a base forming an inclosed chamber, a plurality of arms pivotally mounted within said chamber and extending out of the same, each of said arms being provided with differentially positioned notches, rotary members within said chamber having teeth for engaging said notches, and a lever for operating the rotary members.

2. A lever system comprising a base forming a closed chamber, a plurality of arms pivotally mounted within said chamber and extending out of the same, each of said arms being provided with differentially positioned notches, rotary members within said chamber having teeth thereon successively engageable with the notches of the several pivotally mounted arms for rotating said arms successively and independently, and a lever for operating the rotary members.

3. A lever system comprising a base forming an inclosed chamber, a tubular standard on said base, a plurality of independent movable members mounted within said base, a sleeve in the tubular standard, a plurality of rotary members attached to the sleeve, and a lever for operating the sleeve.

In testimony whereof I affix my signature in presence of two witnesses.

ALTON L. WYMAN.

Witnesses:
H. A. BOWMAN,
F. A. WHITELEY.